(12) United States Patent
Denoue et al.

(10) Patent No.: US 7,699,476 B2
(45) Date of Patent: Apr. 20, 2010

(54) SYSTEM AND METHOD FOR OPERATING PHOTO-ADDRESSABLE EPAPER ENVIRONMENT

(75) Inventors: Laurent Denoue, Palo Alto, CA (US); Eleanor G. Rieffel, Mountain View, CA (US); Lynn D. Wilcox, Palo Alto, CA (US); Jonathan Foote, Menlo Park, CA (US); David M. Hilbert, Palo Alto, CA (US); Giovanni L. Thione, San Francisco, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 781 days.

(21) Appl. No.: 11/524,733

(22) Filed: Sep. 20, 2006

(65) Prior Publication Data

US 2008/0068566 A1    Mar. 20, 2008

(51) Int. Cl.
*G03B 21/00* (2006.01)
(52) U.S. Cl. .................. 353/122; 353/85; 359/443
(58) Field of Classification Search .................. 359/443, 359/452, 454, 459; 353/30, 31, 69, 70, 85, 353/121, 122
See application file for complete search history.

(56) References Cited

U.S. PATENT DOCUMENTS 7,072,108 B2 * 7/2006 Cruz-Uribe et al. ......... 359/443
2007/0097333 A1 * 5/2007 Zavarehi et al. ............ 353/85
2007/0171462 A1 * 7/2007 Shoya et al. ............... 358/1.15

OTHER PUBLICATIONS

Kjeldsen, Rick, et al., "Interacting with Steerable Projected Displays," *Proc. of 5th International Conference on Automatic Face and Gesture Recognition (FG '02)*, May 20-21, 2002, Washington, D.C.
Van Baar, Jeroen, et al., "Seamless Multi-Projector Display on Curved Screens," *The Eurographics Association, Eurographics Workshop on Virtual Environments (EGVE)*, May 2003, pp. 281-286, ACM Press.
Bimber, Oliver, et al., "Embedded Entertainment with Smart Projectors," *IEEE Computer*, Jan. 2005, pp. 48-55, 0018-9162/05, IEEE Computer Society.
Pinhanez, Claudio S., et al., "Ubiquitous Interactive Graphics," *IBM Research Report*, May 17, 2002, pp. i-10, RC22495 (W0205-143), IBM Research Division, New York, U.S.A.
Arisawa, Hiroshi, et al., "Photo-addressable E-Paper and Toner Display," *IS&T's NIP20: 2004 International Conference on Digital Printing Technologies*, 2004, pp. 922-926, Kanagawa, Japan.

* cited by examiner

*Primary Examiner*—Georgia Y Epps
*Assistant Examiner*—Sultan Chowdhury
(74) *Attorney, Agent, or Firm*—Sughrue Mion, PLLC

(57) ABSTRACT

A system for providing a dynamic audio-visual environment using an eSurface situated in a room environment; a projector situated for projecting images onto the eSurface; a camera situated to picture the room environment; a central processor coupled to the eSurface, the projector and the camera. The processor receives pictures from the camera for detecting the location of the eSurface; and controls the projector to aim its projection beam onto the eSurface. The eSurface is a sheet-like surface having the property of accepting optically projected image when powered, and retaining the projected image after the power is turned off.

21 Claims, 3 Drawing Sheets

SYSTEM AND METHOD FOR OPERATING PHOTO-ADDRESSABLE EPAPER ENVIRONMENT

BACKGROUND

1. Field of the Invention

The subject invention relates to operation of environments containing photo-addressable ePaper technology.

2. Related Art

Photo addressable ePaper has been developed by the subject assignee, Fuji-Xerox of Japan. The photo-addressable ePaper technology provides a photosensitive medium that, when energized, accepts a light input to generate an image that is maintained on display after the power is removed from the media. For example, if the media is energized and one uses a laser pointer to write on the ePaper, the writing will remain displayed on the ePaper after the power is removed. Similarly, if one projects an image onto the ePaper using, e.g., an LCD projector, when the ePaper is powered, the projected image will remain displayed by the ePaper after the power is removed. There are two different types of ePaper, one that is written to by light from behind, and one that is written to from the front. For further information relating to this technology the reader is directed to: H. Arisawa, et al., "Photoaddressable Electronic Paper Using Cholesteric Liquid Crystal" IS$T NIP17-228 (2001); T. Kakinuma, et al., "Black and White Photoaddressable Electronic Paper using Encapsulated Cholesteric Liquid Crystal and Organic Photoconductor" IDW '02, p. 1345 (2002); H. Kobayashi, et al., "A novel Photoaddressable Electronic Paper Using Organic Photoconductor Utilizing Hydroxy Gallium Phtalocryanine as a Charge Generation Material" Asia Display, p. 1731 (2001); S. Yamamoto, et al., "A Novel Photoaddressable Electronic Paper Utilizing Cholesteric LC Microcapsules and Organic Photoconductor" SID '01 Digest, p. 362 (2001); and U.S. patent application Ser. No. 11/243,603, all of which are incorporated herein in their entirety.

Various technologies have been proposed to provide a "smart room" environment, such as, e.g., for conferences and meetings. Some of that effort has been directed at enabling and controlling display of various images at various locations in the room. One proposal uses an LCD projector, a pan/tilt mirror, and a camera. The mirror is used to deflect the image of the projector to surfaces, walls, or the floor of a room, according to the user's desires. In this manner, a single projector can be used to project images on different locations in the room. However, as can be understood, since the projector is stationary, some surfaces would be tilted with respect to the projector, thereby leading to a distortion in the projected image. Therefore it has been proposed to process the projected image to compensate for the perspective distortion. For further information the reader is directed to F. Kjeldsen, C. Pinhanez, G. Pingali, J. Hartman, T. Levas, and M. Podlaseck, "Interacting with Steerable Projected Displays." In Proc. of the 5th International Conference on Automatic Face and Gesture Recognition (FG'02). 2002, which is incorporated herein by reference.

In fact, the technology relating to correcting for perspective distortion has been progressed beyond just correction for projection angle. Technologies have been proposed to enable displaying correct images onto arbitrary existing screen surfaces, like wallpapered walls or window curtains. Such projectors can function without an artificial canvas and consequently leave users more freedom in the decision on how and where to project the image. Such projectors combine camera feedback with structured light projection to gain information about the screen surface and the environment. The calibration of such a device enables correction of video signals in real-time. Neither geometry information nor projector or camera parameters need to be known. Instead, the entire calibration and correction (geometry and color) is done on a per-pixel level supported by modern pixel shader hardware. For further information the reader is directed to Bimber, O., Emmerling, A., and Klemmer, T. Embedded Entertainment with Smart Projectors. IEEE Computer, pp. 56-63, January issue 2005, which is incorporated herein by reference.

SUMMARY

According to various embodiment of the invention, methods and systems provide smart environments utilizing photo-addressable ePaper technology. In various aspects of the invention, a camera is used to enhance the usability and benefit of the photo-addressable ePaper. In other aspects of the invention, the camera's images are used to control projection of images on ePaper.

According to an aspect of the invention, a system for providing a dynamic audio-visual environment includes an eSurface situated in a room environment; a projector situated for projecting images onto the eSurface; a camera situated to picture the room environment; a central processor coupled to the eSurface, the projector and the camera; the processor receiving pictures from the camera for detecting location of the eSurface; and controlling the projector to aim projection beam of the projector onto the eSurface; and, the eSurface comprises a sheet-like surface having the property of accepting optically projected image when powered, and retaining the projected image after the power is turned off. The processor may determine the location of the eSurface by: turning the eSurface white; instructing the camera to take a first picture of the room environment while the eSurface is turned white; turning the eSurface black; instructing the camera to take a second picture of the room environment while the eSurface is turned black; and analyzing the difference between the first picture and second picture. The processor may turn the eSurface white by applying to the eSurface a first electrical pulse and may turn the eSurface black by applying to the eSurface a second electrical pulse. The processor may write an image onto the eSurface by: energizing the eSurface; controlling the projector to project an image onto the eSurface while the eSurface is energized; turning off the eSurface; controlling the projector to cease projection of the image after the eSurface has been turned off. The system further includes a graphical user interface. The graphical user interface enables users to control operation of the eSurface, the projector, and the camera. The graphical user interface enables users to select image to be projected onto a selected eSurface. The graphical user interface may enable users to select image to be protected onto a selected eSurface by dragging the image onto the image of the selected eSurface. The system may further include memory for storing pictures taken by the camera and images projected by the projector.

The processor may determine the location of the eSurface by: projecting a first image onto the eSurface; instructing the camera to take a first picture of the room environment while the eSurface displays the first image; displaying a second image on the eSurface; instructing the camera to take a second picture of the room environment while the eSurface displays the second image; analyzing the difference between the first picture and second picture. One of the first image and second image may be a blank black image. One of the first image and second image may be a blank white image. One of the first image and second image may be a calibration image.

According to another aspect of the invention, a method for operating a meeting room having at least one eSurface, a camera and a projector situated therein, comprises: performing a first procedure to determine coordinates of the eSurface within the room; aiming the projector towards the eSurface; performing a second procedure to write an image onto the eSurface; wherein the eSurface comprises a sheet-like surface having the property of accepting optically projected image when powered, and retaining the projected image after the power is turned off. The first procedure may comprise turning the eSurface white; instructing the camera to take a first picture of the room while the eSurface is turned white; turning the eSurface black; instructing the camera to take a second picture of the room while the eSurface is turned black; analyzing the difference between the first picture and second picture. The second procedure may comprise energizing the eSurface; controlling the projector to project an image onto the eSurface while the eSurface is energized; turning off the eSurface; controlling the projector to cease projection of the image after the eSurface has been turned off. Turning the eSurface white may comprise energizing the eSurface; controlling the projector to project a blank image onto the eSurface while the eSurface is energized; turning off the eSurface; controlling the projector to cease projection of the image after the eSurface has been turned off. Turning the eSurface black may comprise energizing the eSurface; darkening the room while the eSurface is energized; turning off the eSurface. Turning the eSurface white may comprise applying to the eSurface a first electrical pulse and wherein turning the eSurface black comprises applying to the eSurface a second electrical pulse. The first procedure may comprise: projecting a first image onto the eSurface; instructing the camera to take a first picture of the room environment while the eSurface displays the first image; displaying a second image on the eSurface; instructing the camera to take a second picture of the room environment while the eSurface displays the second image; analyzing the difference between the first picture and second picture. One of the first image and second image may be a calibration image.

DETAILED DESCRIPTION

Figure 1:
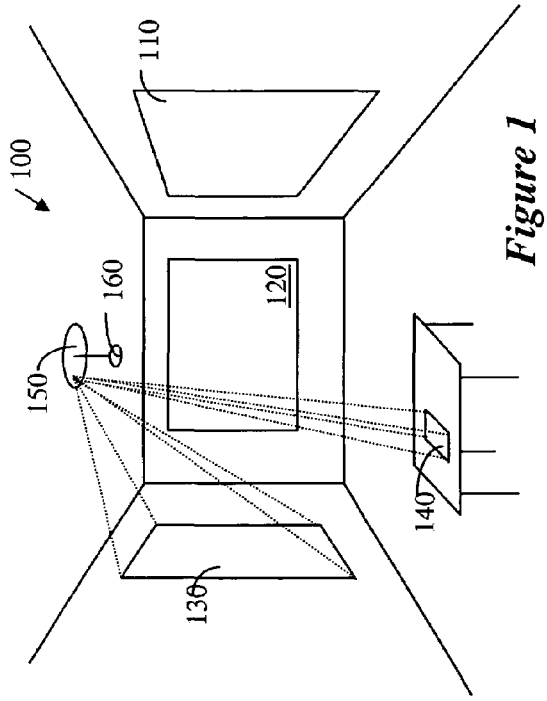
FIG. 1 depicts an illustration of a "smart room" according to an embodiment of the invention.

FIG. 1 depicts a generic room 100, e.g., office, classroom, conference room, etc., where ePaper surfaces (eSurfaces) may be attached anywhere on walls, e.g., 110, 120, 130, or even on desks as personal information sheets during meetings, e.g., 140. Within the context of this disclosure, eSurface refers to any sheet-like surface having the property of accepting optically projected image when powered, and retaining the projected image after the power is turned off. These eSurfaces may be moved easily because ePaper can be lightweight. Additionally, because the eSurfaces only require power when the content is changed, they can be used not only to replace conventional electronic screens, but also as displays with relatively static content like signs, logos, and artwork. Particularly for shared spaces, like classrooms and conference rooms, the ability to quickly and easily change the content of the displays in the room has significant appeal. One can imagine corporate conference rooms that can be quickly changed from a formal feel to an informal one, rooms at convention centers in which the corporate logo and product posters may be changed instantly between each presentation, or shared classrooms in which the side displays are updated to set content appropriate to the class, be it math or Japanese. In each of these settings, while some of the eSurfaces may hold the same content throughout the meeting, other eSurfaces may be used to show content that changes under the control of the presenter or other participants in the room or remotely.

Each of the eSurfaces 110, 120, 130, and 140, are provided with appropriate power supply (not shown) which may be from the power grid or from batteries. For best results, power supply to all of the eSurfaces should be controllable by a control panel or a central processor, as will be described herein with reference to FIGS. 1 and 2.

As shown in FIG. 1, a camera 160 is provided in a central location, such as in the middle of the ceiling. The camera is located so that it can capture any eSurface in the room, either by mechanical means, such as servo motors, or by optical means, such as folding mirrors and lenses. Also, a projector 150 is provided in a central location, e.g., the middle of the ceiling, and is also located so that it can project on any eSurface in the room, either by mechanical means, such as servo motors, or by optical means, such as folding mirrors and lenses. One embodiment for controlling the arrangement shown in FIG. 1 is illustrated in FIG. 2.

Figure 2:
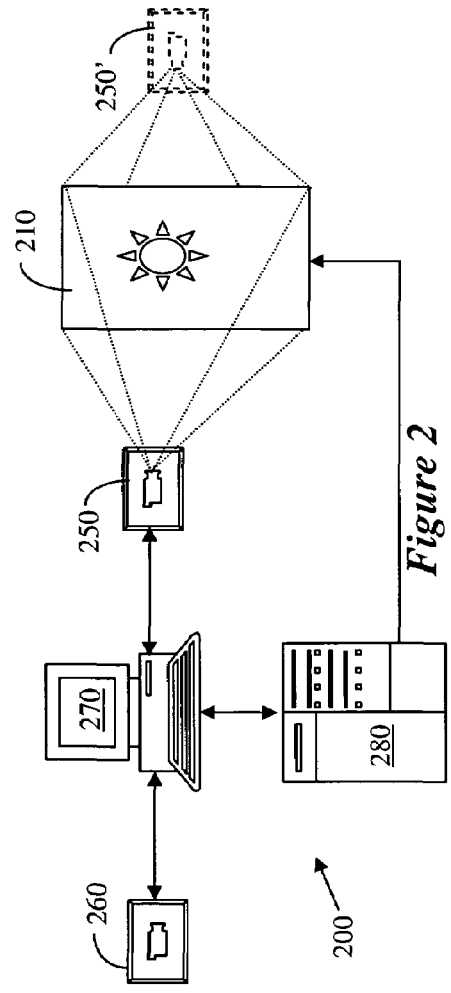
FIG. 2 depicts an illustration of a control system for a smart room according to an embodiment of the invention.

FIG. 2 depicts an illustration of a control system for a smart room according to an embodiment of the invention. In FIG. 2, a central processor 270 controls the actions of the camera 260, the projector 250, and the control panel 280, which controls the power supply to all of the eSurfaces, e.g., eSurface 210. In this manner, the central controller 270 can energize and de-energize any of the eSurfaces individually, in unison or in any combination desired. As can be understood, while control panel 280 is shown here as a separate element from controller 270, it may instead be built into controller 270, so that it is integrated into controller 270. The central controller 270 can also direct the projector 250 to project an image on any eSurface 210, individually, in unison or in any combination desired. The central processor 270 further controls the camera 260 to image any of the eSurfaces individually, in unison or in any combination desired. While only one projector 250 and one camera 260 are shown connected to the processor 270, any number of such devices can be connected to and controlled by the processor 270. For example, a rear-projection projector 250' is depicted in broken-line to illustrate an optional rear-projection implementation.

Figure 3:
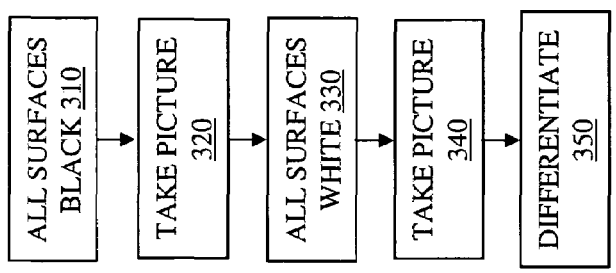
FIG. 3 depicts a block diagram illustrating a process executed by a control system according to an embodiment of the invention.

To begin using the system illustrated in FIGS. 1 and 2, all of the eSurfaces present in the room need to be located by the system. To do that, the system follows the process illustrated in FIG. 3. The process begins at step 310, where the controller 270 instructs all of the eSurfaces to turn black. The eSurfaces can be made all black simply by writing to them when the room is dark, i.e., energizing the eSurfaces and turning off all of the lights in the room using control panel 280. Then the power to the eSurfaces is turned off and the lights can be turned on. At this point, the eSurfaces will maintain a black surface image. Of course, other methods can be used to have all of the eSurfaces present a black surface. Then, at step 320, the controller 270 instructs the camera 260 to take an image, or multiple images of the entire room. At step 330 the controller instructs all of the eSurfaces to turn white. This can be done by writing to them when the room is extremely brightly lit, or by simply projecting onto the eSurface bright light using projector 250. That is, the power to the eSurfaces is turned on while the room is brightly lit, and then the power to the eSurfaces is turned off. At step 340 the controller 270 again instructs the camera 260 to take a picture or multiple pictures of the entire room. At step 350 the controller 270 subtracts one image from the other so that it obtains the difference of the images to thereby determine where all of the eSurfaces are located at.

It should be understood that in the description above, the reference to turning the eSurfaces black or white encompasses a situation where all of them are turned together, in unison, or in any desired combination, and the images are then taken accordingly. Additionally, rather than simply writing a blank image, such as a blank white image, a specific image can be projected, such as a calibration image, to enable the system to better decipher the orientation of each eSurface. Also, it is possible to turn the eSurfaces white or black by using applied voltages. More specifically, by using a high frequency pulse over the response time of OPC, it is possible to write black or white under any ambient light intensity. According to one eSurface embodiment, the frequency may be several hundreds Hz, and required voltage is 400V for black and 650V for white.

Figure 4:
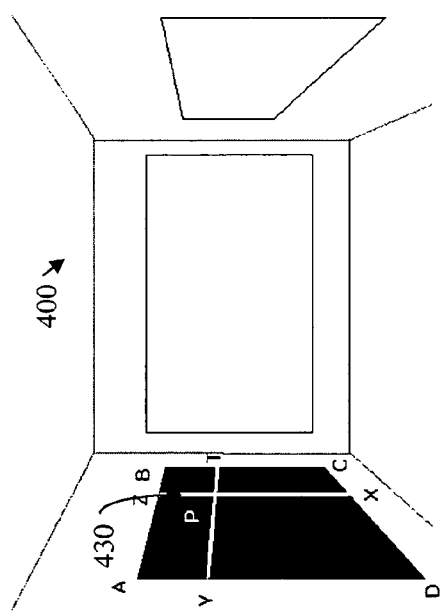
FIG. 4 illustrates a difference image according to an embodiment of the invention.

The process of differentiation and determining the parameters for each eSurface can be understood from the following description, with reference to the illustration in FIG. 4. FIG. 4 illustrates a difference image according to an embodiment of the invention, wherein the projection of eSurface 430 is calculated based on the assumption that eSurface 430 is rectangular, as illustrated by surface 430'. For such rectilinear eSurfaces, first, the four corners of the black area A,B,C and D are determined. The original image (a,b,c,d) needs to be transformed before projection by distorting it so that (a,b,c,d) becomes (A,B,C,D). According to one embodiment, the eSurface is assumed to be planar. In that case, the computation is a simple homothetic transform. To any point p(x,y) in (a,b,c,d), corresponds a point P(X,Y) in (A,B,C,D). P is at the intersection of the segments [X,Z] and [Y,T]. Note that the convention used herein is lower case denotes a length of a segment, e.g., "xd," while capitals denote a vector, e.g., "DX". Also, reference should be made to FIG. 4 for the definitions. Let u=xd/cd and v=dy/da, then:

the coordinates of X are given by DX=t DC (vectors)
the coordinates of Y are given by DY=v DA (vectors)
the coordinates of Z are given by AY=t AB (vectors)
the coordinates of T are given by CT=v CB (vectors)

Because the coordinates of A,B,C,D are known, the coordinates of X,Y,Z,T can be computed. P is then the intersection between (XZ) and (YT).

Inversely, for each point P of the projected image, we can compute its coordinate in the original image by the inverse transform. It is better to scan all pixels in the projected image and find its corresponding pixel value in the original image because not every pixel in the original image might map to a pixel in the projected image, causing gaps in the projected image. For non-rectilinear and curved surfaces more complex methods along these lines would be used.

Sometimes, the camera 260 or the projector 250 cannot see an eSurface entirely. For example, the real left edge of the left eSurface is not reached, occluding the real edge [AD]. In this case, a virtual edge [AD] is defined by looking at the left-most black column in the picture. The same applies to right-most eSurfaces. With this method, a part of the eSurface is still "printable" even though the projector beam is not able to reach the entire area.

If achieving bright enough light to turn an eSurface white without the use of light from the projector is difficult, then one can imagine that before an eSurface is moved, the projector illuminates the eSurface so as to turn it white to be easily located. Alternatively, its most recently projected image is recorded and the eSurface is located by looking for an eSurface that turns black and previously had that projected image. Similarly the camera can be used to update location information as eSurfaces are moved in the course of a meeting.

Once a surface has been located, a set pattern can be projected onto it that enables judging the distance of the eSurface from the projector, and for determining whether it is tilted, or otherwise distorted. Such detection can enable the projector to write to each eSurface with the correct amount of light intensity, possibly varying intensity for different parts of the eSurface. Similarly, the image projected can be modified to take into account tilting or distortion of the eSurface. For example, a checkerboard pattern can be projected as a calibration image to verify that no distortion is present in the image, or to calculate further transformation needed in order to avoid any distortions. A checkerboard patterns enables easy checking for distortion, as each square in the pattern can be checked to have 90 degrees angles, and such pattern also enables easy check for brightness, as each square should have the same intensity, as seen by the camera. Of course, other calibration images can be used instead of, or in addition to a checkerboard image.

To obtain images of all eSurfaces, any conventional technology can be used. For example, multiple lenses integrated into a single camera 260 can be used to locate eSurfaces on all walls and possibly on table tops and the like. Alternatively multiple cameras or a single lens camera 260 can be used, provided it can be rotated and tilted (for example using a step motor). The camera 260 used for locating eSurfaces and updating their position can also be used to detect occlusion that interfere with the projector. If an occlusion is detected, the processor 270 can calculate whether the projector can be operated so that it avoids the occlusion by, for example, rotation or translation of the projector 250 or any optical elements thereof.

Figure 5:
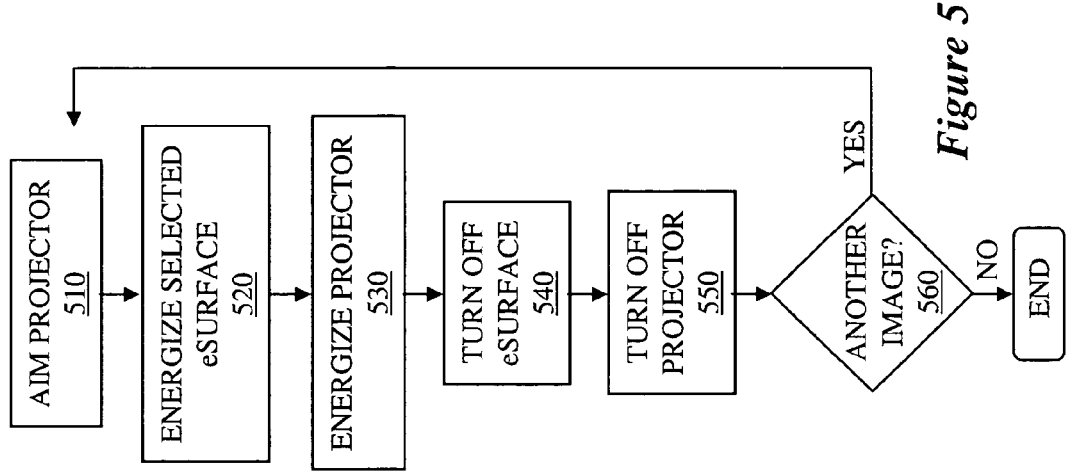
FIG. 5 depicts a process for projecting images on eSurfaces according to an embodiment of the invention.

When an image needs to be projected on one or more screens, the process depicted in FIG. 5 may be implemented by the processor 270. In step 510 the controller aims the projector towards the proper eSurface. This can be done by physically rotating the projector, such as by means of servo motors, or by optical means, such as by optical elements, such as lenses and mirrors. The controller 270 then instructs the power panel 280 to energize the eSurface upon which the image should be projected at step 520. At step 530 the controller energizes the projector 250, so as to project the image onto the selected eSurface. Once the image has been "written" to the eSurface, the controller 270 instructs the power panel 280 to turn off power to the eSurface at step 540, and then turns off the projector 250 at step 550. At step 560 the controller determines whether another image is to be projected. This may be the same image on another eSurface, a different image on the same eSurface, or a different image on a different eSurface. Regardless, if another image is to be written, the process returns to step 510, where the projector is aimed at the proper eSurface, be it the same surface for projecting a different image, or a different eSurface for projecting the same or different image. If no image is to be projected at step 560, the process terminates.

Figure 6:
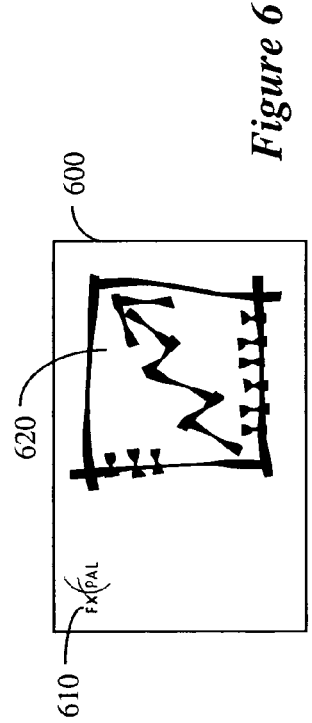
FIG. 6 depicts an embodiment where the eSurface is utilized to display multiple images that are projected onto the eSurface at different times.

The eSurfaces can be used for various purposes and provide "multi-tasking" by clever use of their image retention while the power is turned on or off. One example is provided in FIG. 6. FIG. 6 depicts an embodiment where the eSurface is utilized to display two images that are projected onto the eSurface at different times. That is, in the example of FIG. 6, the eSurface 600 is used as a white screen for projecting a presentation, e.g., a PowerPoint presentation 620, but also to display a logo 610. For example, if the eSurface is used in a convention center, the logo 610 can be easily changed to that of the presenter of presentation 620. This can be done as follows. First, the process of FIG. 5 is performed once to project the logo onto the eSurface. At the end of the first iteration of the process of FIG. 5, the eSurface will display the logo 610 as shown in FIG. 6, and the remaining surface would be simply white. As can be understood, this is done by projecting onto the eSurface an image that is a white rectangle the size of the eSurface, and having the logo at the corner, as shown in FIG. 6. Now, with the power to the eSurface still off, the eSurface can be used as a white screen for projecting the presentation 620 as depicted in FIG. 6. Since the power is still off, the image of the presentation 620 will not be written to the eSurface, but the logo would be retained until it is overwritten. As can be appreciated, presentation 620 may be dynamic content, such as a video, since no refresh of the eSurface is needed. Rather, the surface is used merely as a blank screen.

Figure 7:
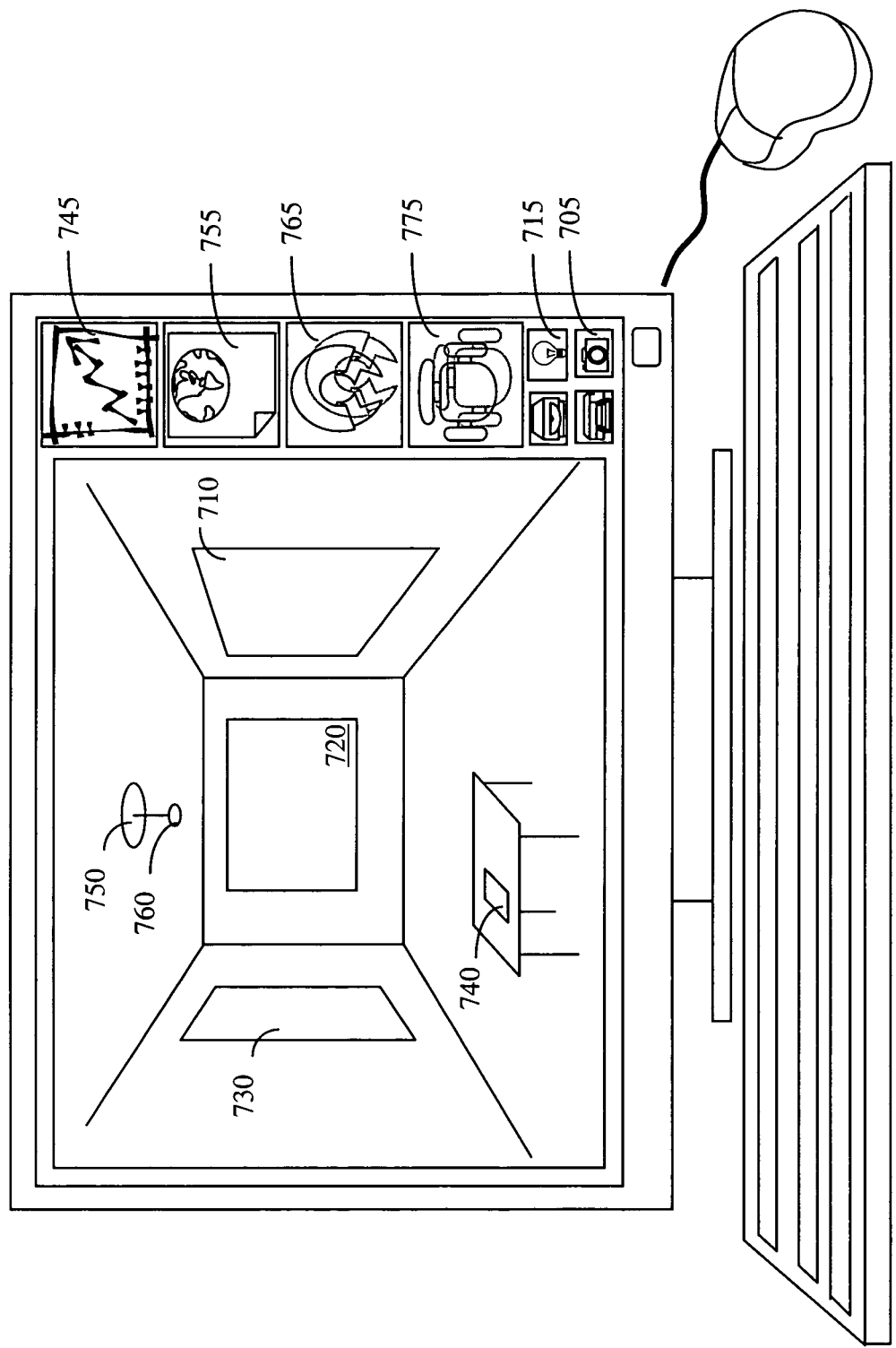
FIG. 7 depicts a graphical user interface according to an embodiment of the invention.

FIG. 7 depicts a graphical user interface according to an embodiment of the invention. The user interface of FIG. 7 can be implemented on a pre-programmed general purpose computer (PC or Mac) or using a specially designed hardware. The user interface can be made to display an image of the room with the projector 750, camera 760 and all eSurfaces 710-740. The image of the room may be a 2-d or 3-d elevation image, model, sketch, etc. The user interface may include controls for controlling the projector 750, camera 760 and eSurfaces 710-740. By way of illustration, icon 705 may be a toggle button for turning the camera on or off, for taking a picture, or for opening a menu to enable various controls of the camera, such as zoom, exposure, etc. Similar controls can be provided for the projector 750, and the eSurfaces 710-740. Additionally, controls can also be provided to control the room environment, such as turning on/off or dimming the room's lights, controlling room temperature, and controlling mechanized shades, etc. By way of example, icon 715 enables controls of the room's lights, but other such icons can be provided for other room control. In a similar manner, icons can be provided to enable control of peripherals connected to the system. For example, icon 725 enables control of storage peripheral, for storing information, such as video and audio of the meeting, saving images projected by the projector 750, and saving pictures taken by camera 760. Icon 735 enables control of a printer, fax machine, or multi-function copier machine. As with icon 705, any of the other icons can be made to open a menu enabling further controls and features.

Another feature illustrated in FIG. 7 is the ability of participants to control content presented on each of the eSurfaces 710-740. In this example, various contents that can be projected onto an eSurface are displayed on the side of the graphical user interface, e.g., 745, 755, 765, and 775. Each of these contents can come from various sources connected to the system, such as laptop computers, servers, video conferencing system etc. When a user wishes to project a content, the user can drag the desired image onto the desired image of the eSurface. By way of illustration, if a user has a PowerPoint presentation on a laptop that is connected to the system, the first slide of the PowerPoint presentation can be shown on the graphical user interface, e.g., 745. When the user would like to begin his presentation and display it on the main eSurface 720, the user may drag image 745 onto eSurface 720, at which point the system may follow the process exemplified in FIG. 5 to "write" the first slide of the presentation onto the eSurface 720. On the other hand, if the content to be projected is dynamic, the system may simply follow the process described with respect to FIG. 6 to make the eSurface 720 a white screen for projecting the presentation.

The user interface also provides a way to drag and drop content onto other displays than eSurfaces. For example, a large touch-screen might be present in the room. During initialization of the user interface, the camera can also detect the location of that display and show it on the user interface, allowing users to conveniently move content to either types of surfaces (digital screen or eSurface). When a user drags content onto a specific area, the system knows if it was a digital display, in which case it directly controls it to show the content. Otherwise, the system steers the projector toward this eSurface.

The user interface illustrated in FIG. 7 may also be customizable by each participant, and may enable showing the locations of the eSurfaces from the point of view of that participant. Optionally, content that is shown on the various displays can be captured, along with pictures taken by the camera and sound recorded by an optional microphone. All captured information can be stored on a storage device, as illustrated by icon 725. This archive provides a full view of what happened where and when during the meeting.

Thus, while only certain embodiments of the invention have been specifically described herein, it will be apparent that numerous modifications may be made thereto without departing from the spirit and scope of the invention. Further, certain terms have been used interchangeably merely to enhance the readability of the specification and claims. It should be noted that this is not intended to lessen the generality of the terms used and they should not be construed to restrict the scope of the claims to the embodiments described therein.

The invention claimed is:

1. A system for providing a dynamic audio-visual environment, comprising:
    a plurality of eSurfaces situated in a room environment;
    a projector situated for projecting images onto each eSurface;
    a camera situated to picture the room environment;
    a central processor coupled to all eSurfaces situated in the room environment, said projector and said camera; said processor receiving pictures from said camera for detecting location of all eSurfaces situated in the room environment; and controlling said projector to aim projection beam of said projector onto each eSurface; and,
    wherein each eSurface comprises a sheet-like surface having the property of accepting optically projected image when powered, and retaining the projected image after the power is turned off.

2. The system of claim 1, wherein said processor determines the location of the eSurface by:
    turning the eSurface white;
    instructing the camera to take a first picture of the room environment while the eSurface is turned white;
    turning the eSurface black;
    instructing the camera to take a second picture of the room environment while the eSurface is turned black;
    analyzing the difference between the first picture and second picture.

3. The system of claim 2, wherein the processor turns the eSurface white by applying to the eSurface a first electrical pulse and wherein the processor turns the eSurface black by applying to the eSurface a second electrical pulse.

4. The system of claim 1, wherein said processor writes an image onto said eSurface by:
energizing the eSurface; controlling the projector to project an image onto the eSurface while the eSurface is energized;
turning off the eSurface;
controlling the projector to cease projection of the image after the eSurface has been turned off.

5. The system of claim 1, further comprising a graphical user interface.

6. The system of claim 1, wherein said graphical user interface enables users to control operation of the eSurface, the projector, and the camera.

7. The system of claim 6, wherein said graphical user interface enables users to select image to be projected onto a selected eSurface.

8. The system of claim 7, wherein said graphical user interface enables users to select image to be protected onto a selected eSurface by dragging the image onto the image of the selected eSurface.

9. The system of claim 1, further comprising memory for storing pictures taken by the camera and images projected by the projector.

10. The system of claim 1, wherein said processor determines the location of the eSurface by:
projecting a first image onto the eSurface;
instructing the camera to take a first picture of the room environment while the eSurface displays said first image;
displaying a second image on the eSurface;
instructing the camera to take a second picture of the room environment while the eSurface displays said second image;
analyzing the difference between the first picture and second picture.

11. The system of claim 10, wherein one of said first image and second image is a blank black image.

12. The system of claim 10 wherein one of said first image and second image is a blank white image.

13. The system of claim 10 wherein one of said first image and second image is a calibration image.

14. A method for operating a meeting room having a plurality of eSurfaces, a camera and a projector situated therein, comprising:
performing a first procedure to determine coordinates of each eSurface within the room;
aiming the projector towards each eSurface;
performing a second procedure to write an image onto each eSurface;
wherein each eSurface comprises a sheet-like surface having the property of accepting optically projected image when powered, and retaining the projected image after the power is turned off.

15. The method of claim 14, wherein said first procedure comprises:
turning the eSurface white;
instructing the camera to take a first picture of the room while the eSurface is turned white;
turning the eSurface black;
instructing the camera to take a second picture of the room while the eSurface is turned black;
analyzing the difference between the first picture and second picture.

16. The method of claim 14, wherein said second procedure comprises:
energizing the eSurface;
controlling the projector to project an image onto the eSurface while the eSurface is energized;
turning off the eSurface;
controlling the projector to cease projection of the image after the eSurface has been turned off.

17. The method of claim 15, wherein turning the eSurface white comprises:
energizing the eSurface;
controlling the projector to project a blank image onto the eSurface while the eSurface is energized;
turning off the eSurface;
controlling the projector to cease projection of the image after the eSurface has been turned off.

18. The method of claim 15, wherein turning the eSurface black comprises:
energizing the eSurface;
darkening the room while the eSurface is energized;
turning off the eSurface.

19. The method of claim 15, wherein turning the eSurface white comprises applying to the eSurface a first electrical pulse and wherein turning the eSurface black comprises applying to the eSurface a second electrical pulse.

20. The method of claim 10, wherein said first procedure comprises:
projecting a first image onto the eSurface;
instructing the camera to take a first picture of the room environment while the eSurface displays said first image;
displaying a second image on the eSurface;
instructing the camera to take a second picture of the room environment while the eSurface displays said second image;
analyzing the difference between the first picture and second picture.

21. The method of claim 20, wherein one of said first image and second image is a calibration image.

* * * * *